(12) United States Patent
Uchida

(10) Patent No.: US 7,969,464 B2
(45) Date of Patent: Jun. 28, 2011

(54) MICROSCOPE-USE DIGITAL CAMERA

(75) Inventor: Tomohiro Uchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 362 days.

(21) Appl. No.: 11/602,367

(22) Filed: Nov. 20, 2006

(65) Prior Publication Data

US 2007/0126866 A1    Jun. 7, 2007

(30) Foreign Application Priority Data

Dec. 1, 2005    (JP) ................................. 2005-347864

(51) Int. Cl.
*H04N 7/18*    (2006.01)

(52) U.S. Cl. ..................................... 348/79; 348/211.13

(58) Field of Classification Search .................... 348/79, 348/372, 155, 80
See application file for complete search history.

(56) References Cited

U.S. PATENT DOCUMENTS

| | | | | |
|---|---|---|---|---|
| 6,002,436 | A * | 12/1999 | Anderson | 348/372 |
| 6,172,354 | B1 * | 1/2001 | Adan et al. | 250/221 |
| 6,385,772 | B1 * | 5/2002 | Courtney | 725/105 |
| 6,904,184 | B1 * | 6/2005 | Taylor | 382/294 |
| 6,917,377 | B2 | 7/2005 | Aizaki et al. | |
| 7,075,577 | B2 * | 7/2006 | Tang | 348/362 |
| 7,251,727 | B2 * | 7/2007 | Adams et al. | 713/2 |
| 7,342,611 | B2 * | 3/2008 | Larner et al. | 348/372 |
| 7,471,334 | B1 * | 12/2008 | Stenger | 348/373 |
| 7,540,423 | B2 * | 6/2009 | Harris | 235/462.31 |
| 7,656,428 | B2 * | 2/2010 | Trutna, Jr. | 348/208.1 |
| 2004/0067900 | A1 * | 4/2004 | Wilde et al. | 514/42 |
| 2005/0237412 | A1 * | 10/2005 | Shiohara et al. | 348/333.11 |
| 2006/0190750 | A1 * | 8/2006 | Maggi et al. | 713/320 |
| 2006/0197664 | A1 * | 9/2006 | Zhang et al. | 340/555 |
| 2006/0290950 | A1 * | 12/2006 | Platt et al. | 358/1.2 |
| 2006/0291884 | A1 * | 12/2006 | Okamoto et al. | 399/69 |
| 2007/0229517 | A1 * | 10/2007 | May et al. | 345/501 |

FOREIGN PATENT DOCUMENTS

| | | |
|---|---|---|
| JP | 06-337739 A | 12/1994 |
| JP | 09-197546 A | 7/1997 |
| JP | 2001-292369 A | 10/2001 |
| JP | 2004-023476 A | 1/2004 |
| JP | 2004-186919 A | 7/2004 |
| JP | 2005-173620 A | 6/2005 |

OTHER PUBLICATIONS

Japanese Office Action dated Sep. 21, 2010 (and English translation thereof) in counterpart Japanese Application No. 2005-347864.

* cited by examiner

*Primary Examiner* — Jason Chan
*Assistant Examiner* — Gary C Vieaux
(74) *Attorney, Agent, or Firm* — Holtz, Holtz, Goodman & Chick, PC

(57) ABSTRACT

A microscope-use digital camera equipped with a sleep function includes an image pickup unit for picking up an image and a control unit for controlling so as to shift to a sleep state, or not shift thereto, based on an image picked up by the image pickup unit.

8 Claims, 18 Drawing Sheets

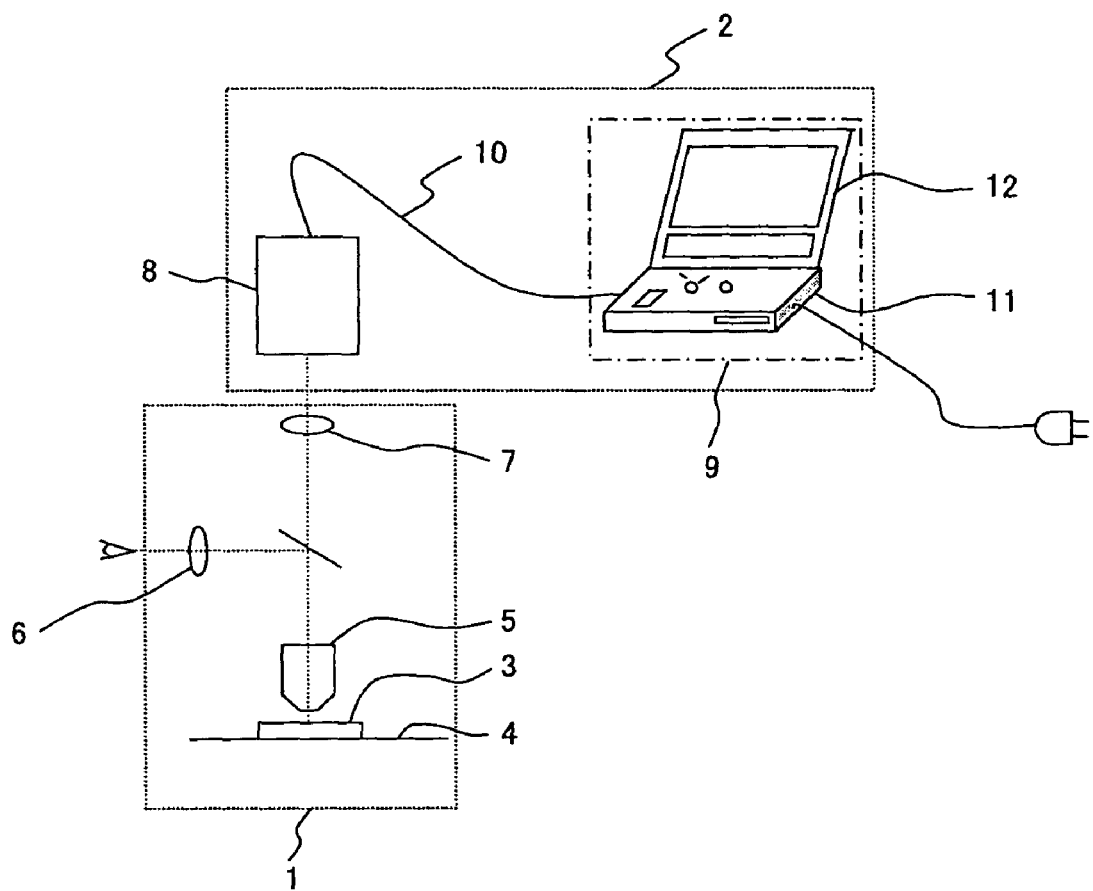
F I G. 1

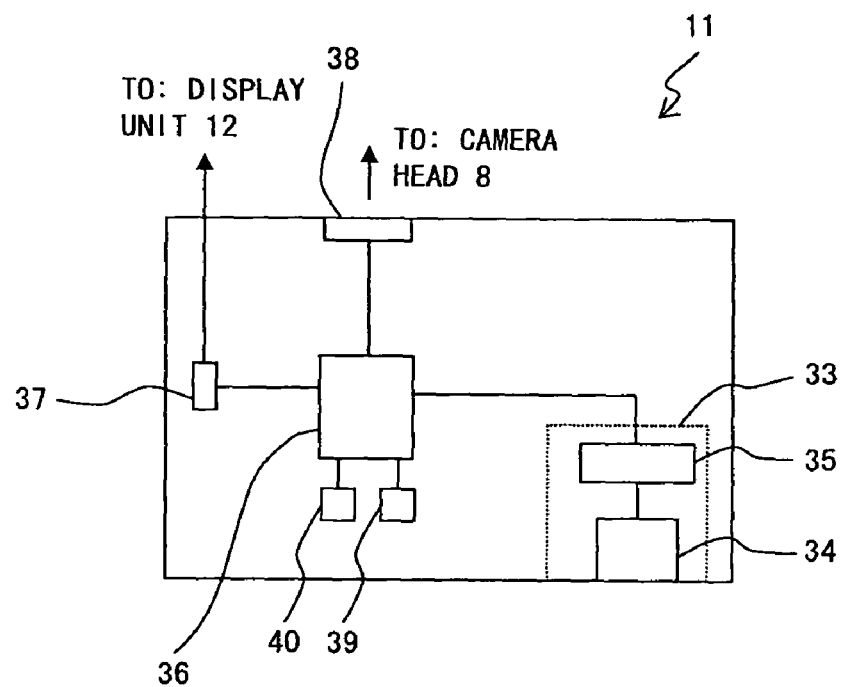
F I G. 4

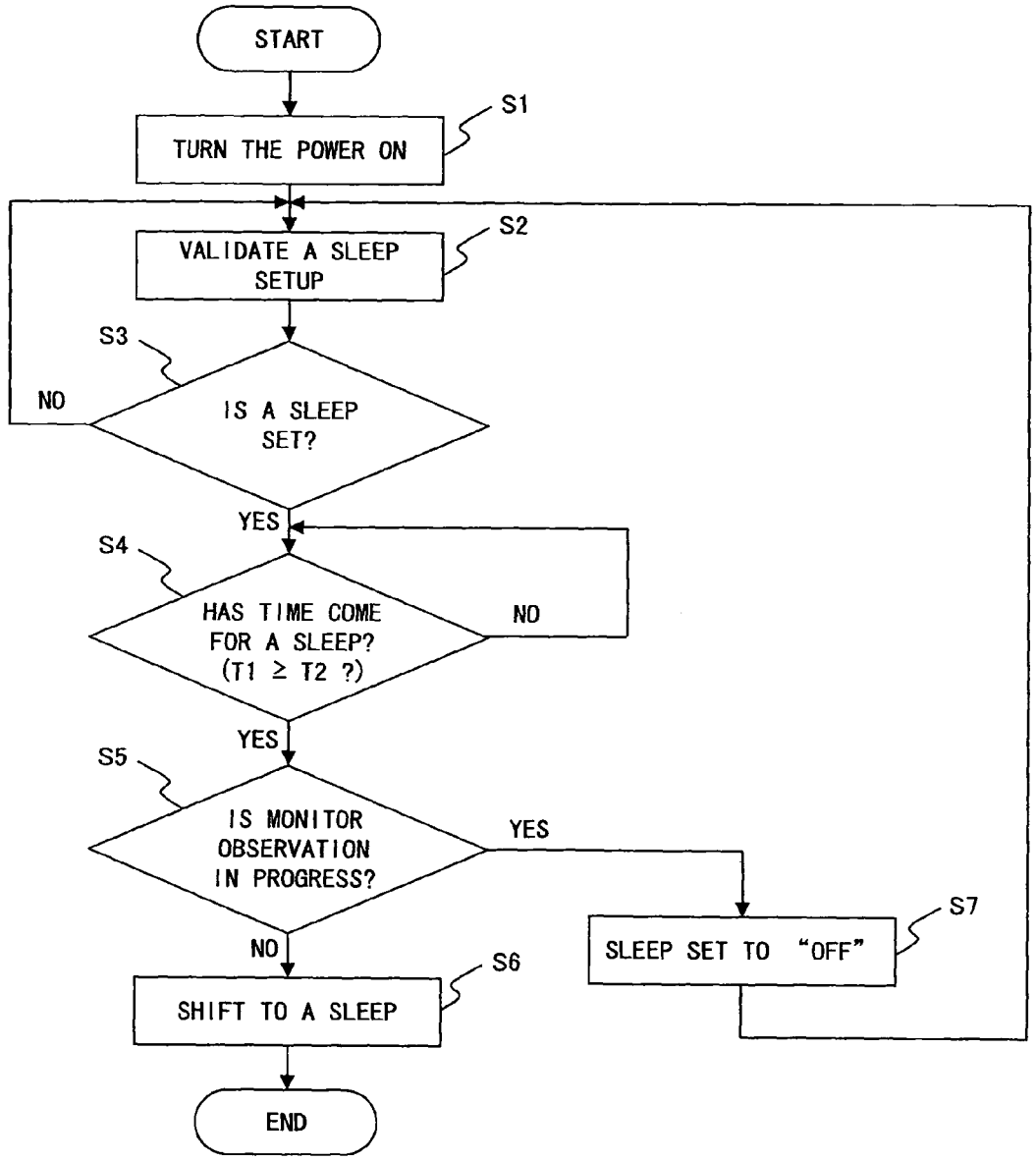
F I G. 9

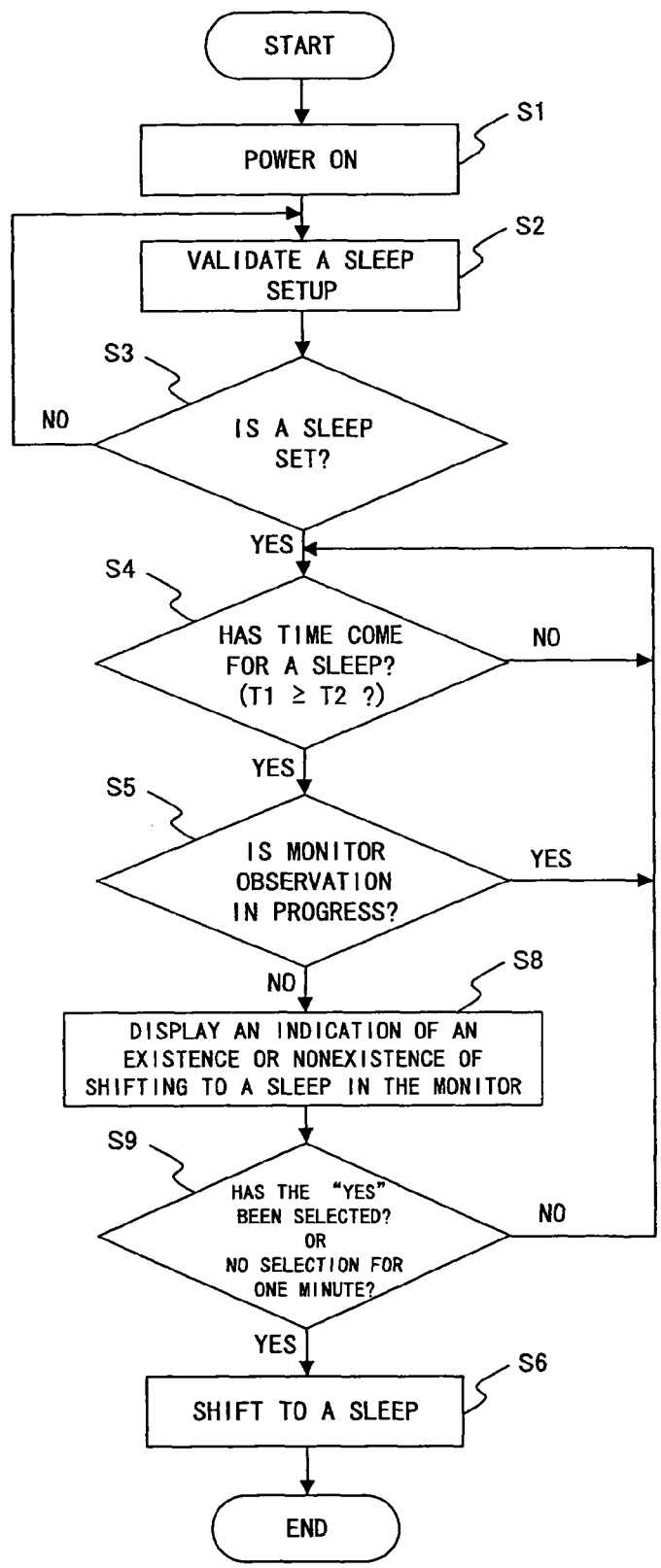
F I G. 1 1

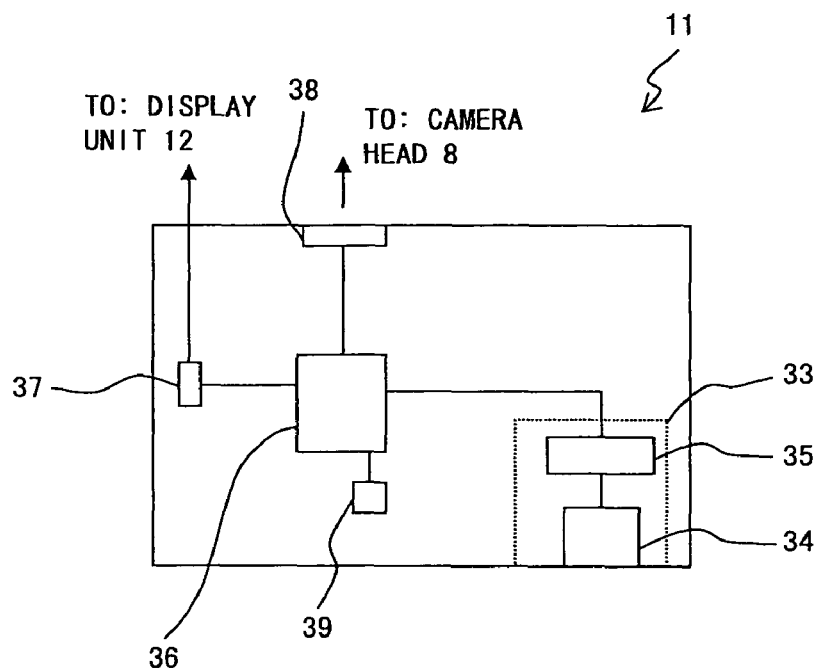
F I G. 1 4

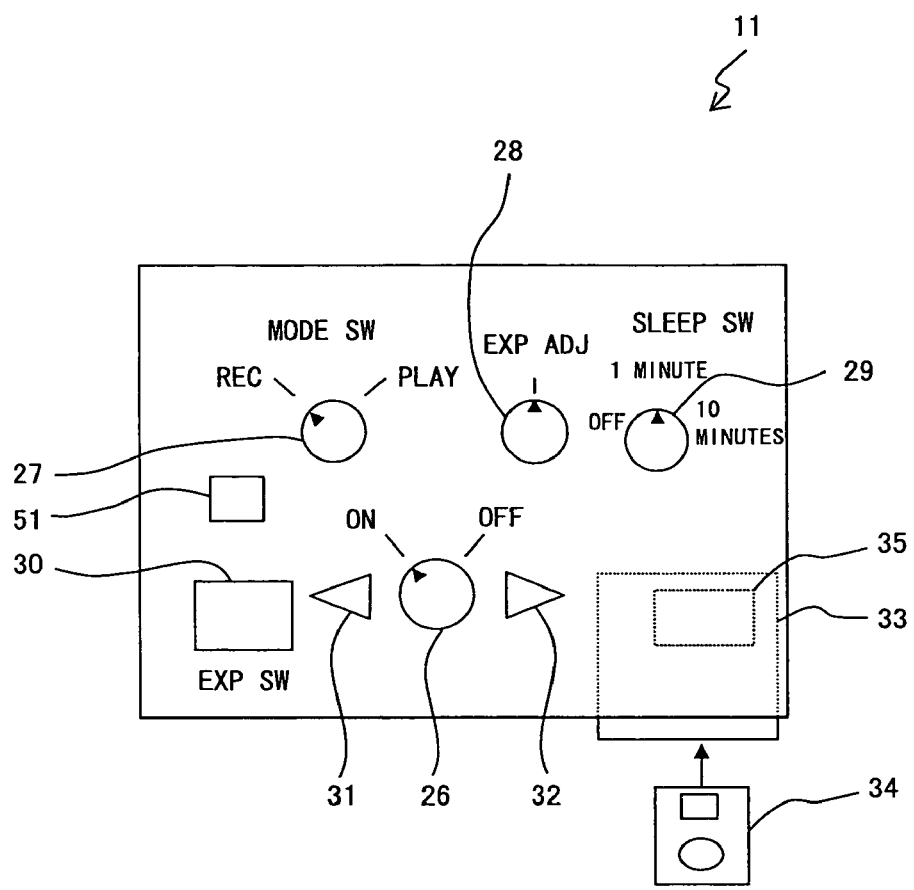
F I G. 1 6

MICROSCOPE-USE DIGITAL CAMERA

CROSS REFERENCE TO RELATED APPLICATIONS

This application is based upon and claims the benefit of priority from the prior Japanese Patent Application No. 2005-347864, filed Dec. 1, 2005, the entire contents of which are incorporated herein by reference.

BACKGROUND OF THE INVENTION

1. Field of the Invention

The present invention relates to a microscope-use digital camera equipped with a sleep function.

2. Description of the Related Art

Some among microscope-use digital cameras are equipped with a sleep function. The sleep function is defined as one for turning off the main power, the power of a partial circuit for bringing down to a low power state, a monitor display, or the back light of an LCD monitor, et cetera, when a switch input, such as a setup operation and photographing operation by an observer, is not performed for a preset length of time. A part or the entirety of functions equipped on the camera is accordingly constrained in a sleep state. The sleep function contributes to an improvement in duration of a battery in the case of a battery-operated camera. A cost reduction and an environmental load reduction are enabled by way of saving the power for a power source in the case of using an external power supply through an AC adaptor, et cetera.

Relating to a digital camera and a computer equipped with such a sleep function, techniques have been disclosed as follows:

For example, a patent document 1 (i.e., Laid-Open Japanese Patent Application Publication No. 09-197546) has disclosed a digital camera equipped with a sleep function. This camera is equipped with an interval photographing function (which is also called a time lapse photographing function) and a function of stopping an unnecessary power supply to a circuit if a photographing is not performed for a predetermined length of time or more, in which a normal state is recovered prior to a photographing operation, and the unnecessary power supply to the circuit is stopped again if a specified length of time elapses after the photographing operation, during an interval photographing.

For another example, a patent document 2 (i.e., Laid-Open Japanese Patent Application Publication No. 06-337739) has disclosed a computer equipped with a sleep function. This computer has a sensor detecting a presence or absence of an operator close by, and controls an auto-power off time according to the result, that is, turns the power off automatically if the operator is not present in the vicinity at a passage of a predetermined time, while extends the predetermined time if the operator is present.

SUMMARY OF THE INVENTION

According to one aspect of the present invention, a microscope-use digital camera equipped with a sleep function comprises an image pickup unit for picking up an image, and comprises a control unit for controlling so as to shift to a sleep state, or not shift thereto, based on an image picked up by the image pickup unit.

BRIEF DESCRIPTION OF THE DRAWINGS

FIG. 1 is a diagram showing an outline comprisal of a microscope system including a microscope-use digital camera according to an embodiment 1;

FIG. 4 is an illustration diagram showing an internal comprisal of the operation unit according to the embodiment 1;

FIG. 9 is a flow chart showing a process relating to a sleep function according to a modified example 5 of the embodiment 1;

FIG. 11 is a flow chart showing a process relating to a sleep function according to a modified example 6 of the embodiment 1;

FIG. 14 is an illustration diagram showing an internal comprisal of the operation unit according to the embodiment 5;

FIG. 16 is an upper external view diagram of an operation unit according to an embodiment 6;

DESCRIPTION OF THE PREFERRED EMBODIMENTS

Figure 2:
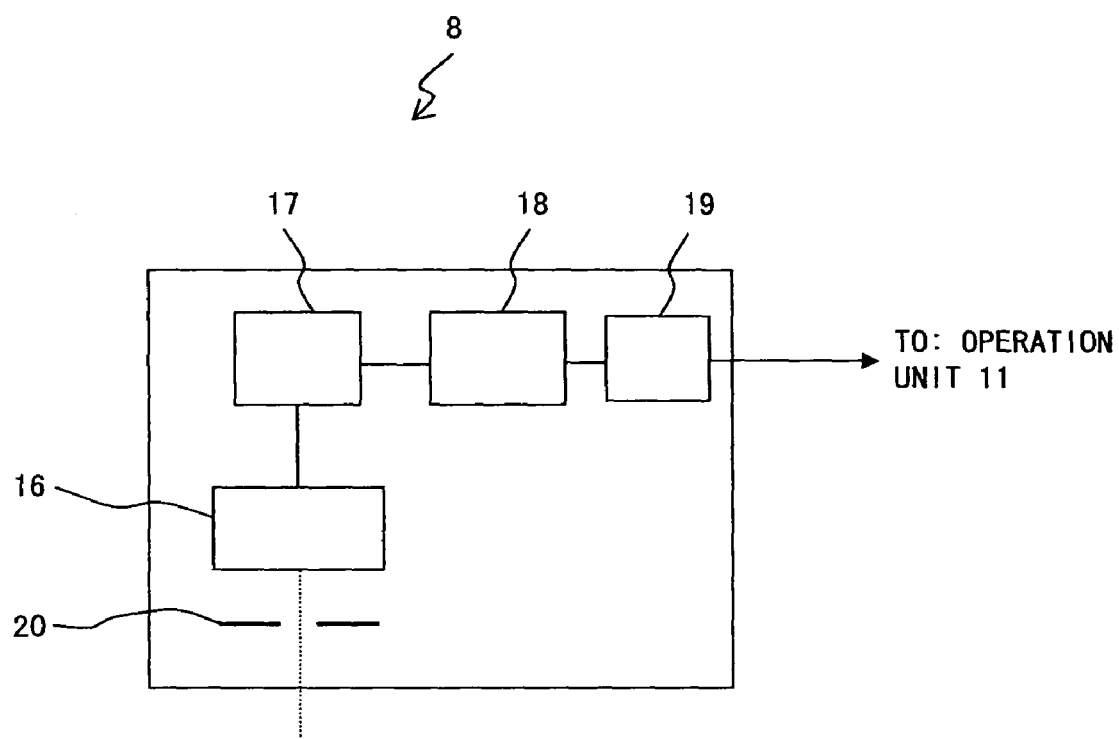
FIG. 2 is a diagram showing an outline comprisal of a camera head.

The following is a description of the preferred embodiment of the present invention by referring to the accompanying drawings.

Embodiment 1

FIG. 1 is a diagram showing an outline comprisal of a microscope system including a microscope-use digital camera according to the embodiment 1.

As shown by FIG. 1, the present system includes a microscope main body 1 and a microscope-use digital camera 2.

The microscope main body 1, comprising a stage 4 placing a sample 3 thereon, an object lens 5, an eye piece lens 6, an imaging lens 7, et cetera, is configured to enable a visual observation of an image of the sample 3 placed on the stage 4 by way of the object lens 5 and eye piece lens 6 and also a monitor observation by way of the object lens 5 and imaging lens 7.

Meanwhile, the microscope-use digital camera 2 comprises a camera head 8, an operation display unit 9 and a cable 10 interconnecting them. This enables a data exchange between the camera head 8 and operation display unit 9. This also enables a photographing operation by the camera head 8 even if the operation display unit 9 is placed apart therefrom within an allowable range of the cable 10.

The camera head 8 is arranged on the optical path of light emitting from the microscope main body 1.

The operation display unit 9 integrally comprises an operation unit 11 for operating the camera head 8 and a display unit 12 for displaying an image of a sample (a "sample image" hereinafter) leading to the camera head 8. The display unit 12 displays not only a sample image but also a series of photographing setups, et cetera, which are set up at the operation unit 11. The operation unit 11 and display unit 12 are fixed by maintaining certain respective angles for enabling an observer to easily operate the operation unit 11 in approximately parallel with a desk top, while the display unit 12 in the range of 0 to 90 degrees, e.g., approximately 90 degrees, when the aforementioned operation display unit 9 is placed on the desk top. Here, the zero ("0") degree means that the operation unit 11 and display unit 12 are placed horizontally, that is, a series of switches such as a later described mode switch of the operation unit 11 and a later described image display panel of the display unit 12 are placed on the same plane.

FIG. 2 is a diagram showing an outline comprisal of the camera head 8.

As shown in FIG. 2, the camera head 8 comprises a photoelectric conversion element 16 for photoelectrially converting a sample image obtained with the microscope main body 1, a sampling circuit 17 for sampling an electric signal supplied from the photoelectric conversion element 16 at a constant time interval, an A/D converter 18 for converting an obtained analog signal to a digital signal, an image process unit 19 for applying a process to a converted digital signal for reproducing the sample image as an image, a shutter 20 for shutting off an optical image projected to the photoelectric conversion element 16 at a desired time. Note that the shutter 20 may be a mechanical shutter for shutting off light mechanically, or an electronic shutter for shutting off light in response to an electric signal. Meanwhile, a photoelectric conversion element 16 adopts an element such as a charge-coupled device (CCD).

A continuous image reproduction of a sample image by using such configured camera head 8 makes it possible to display the sample image in a later described image display panel of the display unit 12 in real time.

Figure 3:
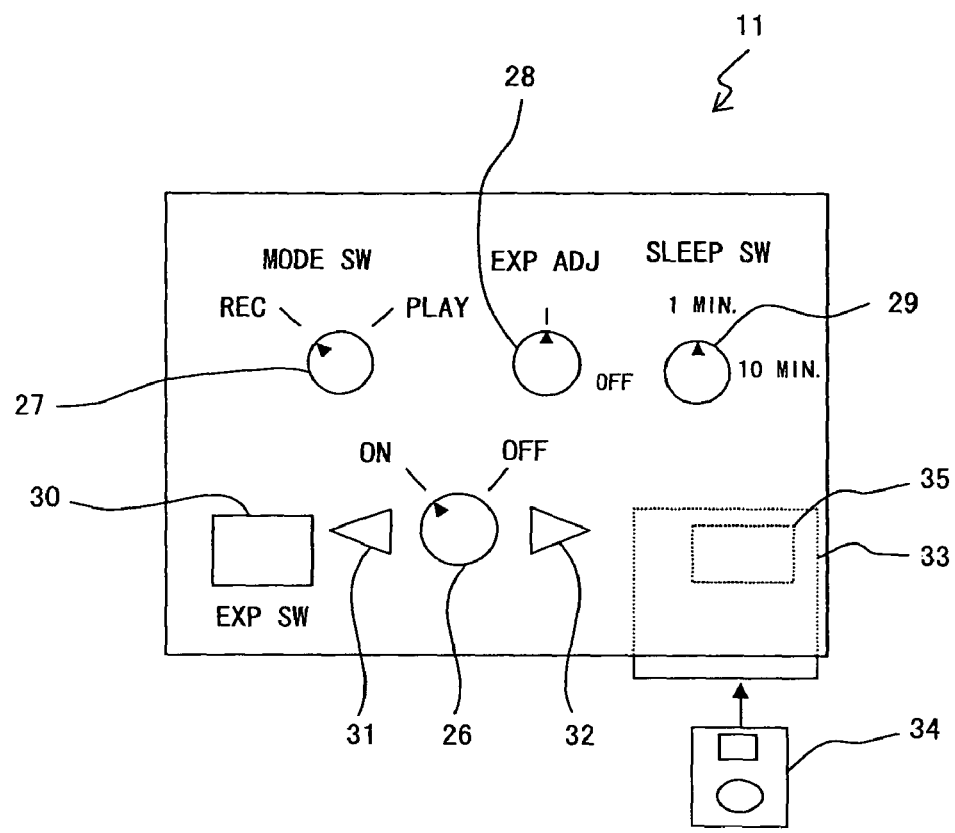
FIG. 3 is an upper external view diagram of an operation unit according to the embodiment 1.

FIG. 3 is an upper external view diagram of the operation unit 11.

As shown in FIG. 3, equipped on the upper surface of the operation unit 11 are a power switch 26, a mode switch (i.e., a mode SW) 27 allowing a selection of at least either a REC mode (i.e., a photographing mode) for carrying out a photographing operation or a PLAY mode (i.e., a replay mode) for replaying a photographed image, an exposure correction switch 28 for setting an exposure correction value, a sleep switch (i.e., a sleep SW) 29 for setting a time for shifting to a sleep state if there in no input of a switch such as the mode switch 28 and exposure correction switch 28, a shutter switch (i.e., an EXP SW) 30 for instructing a photographing, and a left selection switch 31 and a right selection switch 32 which are control switches for the camera head 8 and display unit 12. This configuration makes it possible to have the camera head 8 and display unit 12 carry out prescribed operations by the observer operating the applicable switches.

And equipped in the inside of the operation unit 12 is a memory apparatus 33 for storing a photographed image. The memory apparatus 33 comprises a removable media 34 allowing a detachable attachment, such as a floppy disk widely used for a personal computer (PC), et cetera, and comprises a memory read/write unit 35 for reading/writing a photographed image from/to the removable media 34.

FIG. 4 is an illustration diagram showing an internal comprisal of the operation unit 11.

As shown in FIG. 4, the operation unit 11 comprises a control unit 36 comprising a central processing unit (CPU), read only memory (ROM) storing a program for having the CPU execute a later described series of control process, random access memory (RAM) which is a work memory area for the CPU executing the program, and et cetera. Various operations performed on the operation unit 11 by the observer are analyzed and processed by the control unit 36. The control unit 36 also writes display-use data to a display-use RAM 37 in the case of displaying in the display unit 12. It also carries out a photographing related control for the camera head 8, such as an exposure time, by way of a camera head connector 38 in the case of performing a control relating to photographing. It also carries out the process of outputting image data to the memory read/write unit 35 by making it in a prescribed file format in the case of recording the aforementioned image data from the image process unit 19 of the camera head 8 in the removable media 34. Note that the present embodiment is also configured to manage a data file within a removable media 34 by using a well known File Allocation Table (FAT) file system of the MS-DOS (registered trade mark).

A monitor observation in-progress judgment unit 39 and an operation judgment unit 40 are also connected to the control unit 36.

Figure 5:
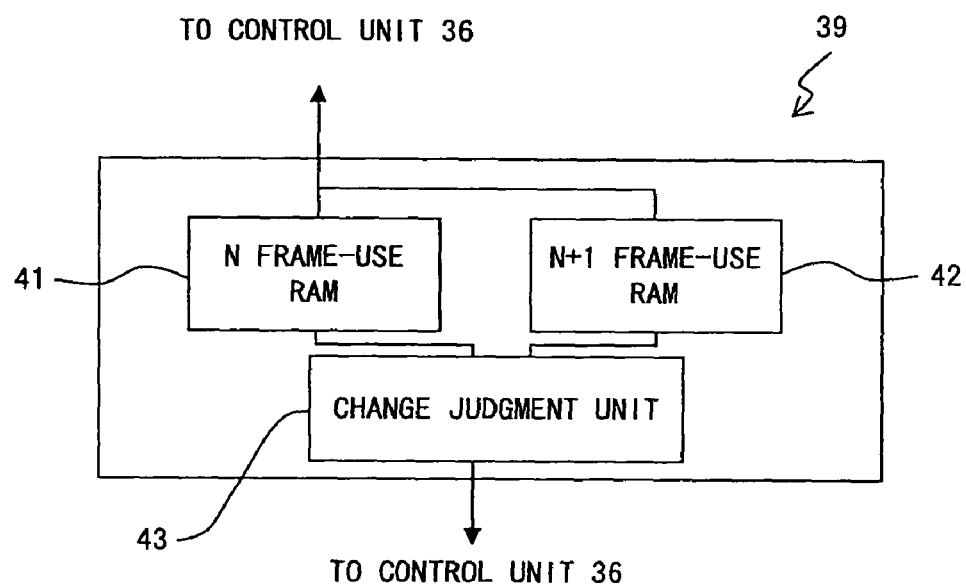
FIG. 5 is an illustration diagram showing an internal comprisal of a monitor observation in-progress judgment unit according to the embodiment 1.

FIG. 5 is an illustration diagram showing an internal comprisal of the monitor observation in-progress judgment unit 39.

As shown in FIG. 5, the monitor observation in-progress judgment unit 39 comprises an N frame-use RAM 41, an N+1 frame-use RAM 42 and a change judgment unit 43.

The N frame-use RAM 41 and N+1 frame-use RAM 42 store (i.e., memorize) copied live images alternately one after another, the process of which is described in detail later. The change judgment unit 43 compares images stored in the two RAM 41 and 42 to judge an existence or nonexistence of a change in the two images. If a result of the judgment is that there is no change, it notifies the control unit 35 of the information indicating a "monitor observation complete", while if the judgment result that there is a change, it notifies the control unit 36 of the information indicating a "monitor observation in progress".

Meanwhile, the operation judgment unit 40 monitors a presence or absence of a switch input such as the mode switch 27, exposure correction switch 28, et cetera, and has a timer (not shown herein) comprised by the aforementioned operation judgment unit 40 measure a time period in which no switch input occurs. This configuration enables the control unit 36 to compare a time period measured by the operation judgment unit 40, in which no switch input (i.e., no switch operation) has occurred, with a time period until shifting to a sleep state set by the sleep switch 29, and judge for a shifting to the sleep state or no shifting thereto.

Figure 6:
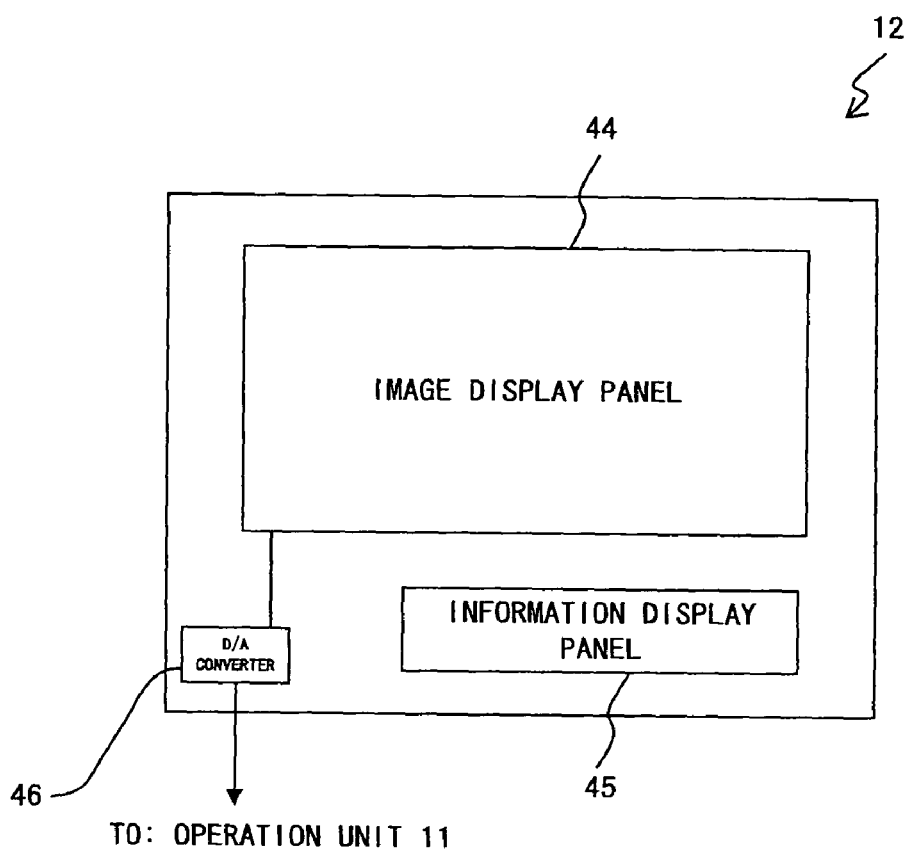
FIG. 6 is an illustration diagram showing an internal comprisal of a display unit.

FIG. 6 is an illustration diagram showing an internal comprisal of the display unit 12.

As shown in FIG. 6, the display unit 12 comprises an image display panel 44 for displaying a photographed image and a replay image of an image stored in the memory apparatus 33, an information display panel 45 for displaying photography information such as an exposure time and exposure correction at the time of photographing and replay information such as an image file at the time of a replay, and a D/A converter 46 for converting from a digital image data signal to an analog signal, which becomes necessary when displaying digital image data from a display-use RAM 37 of the operation unit 11.

In the microscope system including the microscope main body 1 and microscope-use digital camera 2 configured as described above, a sample image is imaged on the photoelectric conversion element 16 by way of the imaging lens 7. By this, the sample image is converted into an electric signal by the photoelectric conversion element 16 as described above. Then, the aforementioned electric signal expressing an image is sampled spatially and temporally by the sampling circuit 17 and is converted into a digital signal by the A/D converter 18, followed by the image process unit 19 applying a prescribed imaging process based on the sampling component, thereby generating a replayable digital image data signal of the sample 3. The digital image data signal is once stored in the display-use RAM 37 by way of the cable 10 and the control unit 36. Then, the stored digital image data signal is transmitted to the display 12, converted into an analog signal by the D/A converter 46 and output to the image display panel 44 to be displayed therein. A continuous operation of this to keep updating the display of an image (N.B.: one piece image is called as one frame) at the rate of 10 to 30 frames a second for example makes it possible to form a moving image. Therefore, it is possible to display a moving image in real time, and each piece of image in this event is accordingly called as a live image. Note that the live image is not recorded in the removable media 34 unless an instruction from the observer is provided (i.e., by pressing the shutter switch 30).

Meanwhile, the present system is configured to enable a setup of at least either a REC mode or PLAY mode by the observer operating the mode switch 27 for selection in the case of displaying an image in the image display panel 44.

In the case of setting the REC mode, the system is configured to allow a setup of the camera head 8 for at least either a live image state mode or photographing in-progress state mode. For example, if the live image state mode is set in the case of the REC mode having been set, it is possible to pick up a dynamic image of the sample 3 in real time by the camera head 8 and display the image in the image display panel 44 in real time. Alternatively, if the photographing in-progress state mode is set in the case of the REC mode having been set, it is possible to photograph an image of the sample 3 in a stop state as a still image by the shutter 20 opening and shutting according to a right exposure time following the observer pressing the shutter switch 30. The photographed image in this event is displayed in the image display panel 44 and the information such as a photographing condition is displayed in the information display panel 45. Also enabled is to record the image data relating to the photographed image in the removable media 34 as an image file by the memory apparatus 33.

Comparably, in the case of setting the PLAY mode, the image data of an image file recorded in the removable media 34 is read out by the memory apparatus 33 by way of the memory read/write unit 35 and displayed in the image display panel 44, while the replay image information such as the replay file name is displayed in the information display panel 45. If the observer presses the left selection switch 31 or right selection switch 32 in this event, the image data of the image file, which is displayable as image among the image files recorded in the removable media 34, is displayed in the image display panel 44 one after another.

The next is a detailed description of a process relating to a sleep function equipped in the microscope-use digital camera 2 included in the present system. Note that the present process is carried out by the control unit 36, that is, more specifically, the process is carried out by the CPU reading and executing the program stored in the ROM.

Figure 7:
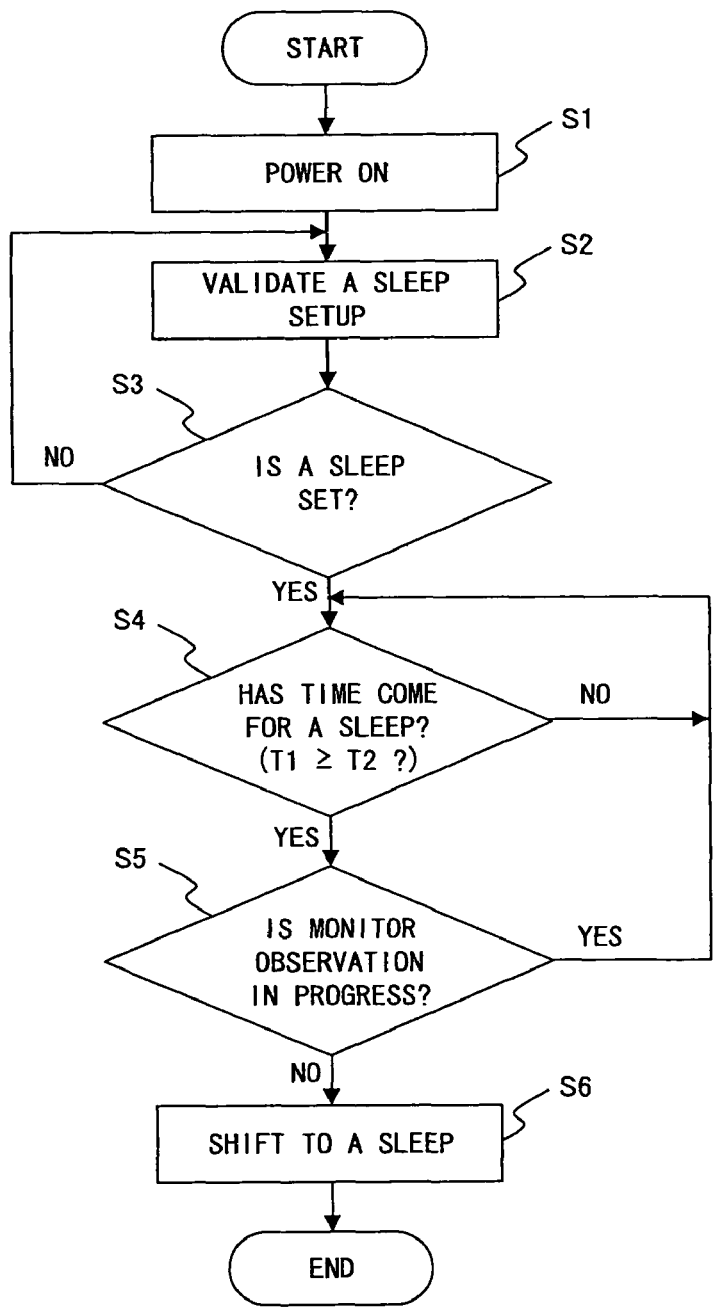
FIG. 7 is a flow chart showing a process relating to a sleep function according to the embodiment 1.

FIG. 7 is a flow chart showing a process relating to the sleep function. Note that the present process assumes the above described REC mode and live image state mode are set.

As shown in FIG. 7, as the control unit 36 detects a pressing of the power switch 26 in the operation unit 11 (S1), then it detects a state of the sleep switch 29 (S2). The present embodiment is configured to enable a selection of either "Off", "1 minute" or "10 minutes" as the state of the sleep switch 29 as shown in FIG. 3, meaning that, if "1 minute" is selected, the time until shifting to the sleep state is one minute.

As a result of the detection in the S2, it then judges whether or not a sleep is set (S3). If the judgment result is "No" (i.e., in the case of a state of the sleep switch 29 being set to "Off") in this event, the process returns to the step S2.

Contrarily, if the judgment result of the S3 is "yes" (i.e., in the case of a state of the sleep switch 29 being set to "1 minute" or "10 minutes"), then the control unit 36 compares between a time (which is defined as T1) of an absence of an switch operation measured by the operation judgment unit 40 and a time (which is defined as T2) until entering a sleep state which is set by the sleep switch 29 and judges whether or not the result becomes T1≧T2 (S4). If the judgment result is "no" (i.e., the case of T1<T2) in this event, it repeats the present judgment.

Contrarily, if the judgment result of the S4 is "yes" (i.e., T1≧T2), it then obtains information notified from the monitor observation in-progress judgment unit 39 and judges whether or not the information is one indicating a "monitor observation in progress" (S5). If the judgment result is "yes" (i.e., if the information indicates a "monitor observation in progress") in this event, it regards as a monitor observation in progress and clears the T1 (i.e., clears it to T1=0), followed by returning to the S4.

Contrarily, if the judgment result of the S5 is "no" (i.e., if the information indicates a "monitor observation complete"), the control unit 36 regards it as the monitor observation complete, followed by shifting to a sleep state (S6).

Note that the present embodiment defines a "shifting to a sleep state" as turning off the display of the image display panel 44 and information display panel 45.

And it defines that a judgment process by the monitor observation in-progress judgment unit 39 determines whether information notified therefrom in the above described step S5 is the information indicating a "monitor observation in progress" or the one indicating a "monitor observation complete". At this point, a description is of the judgment process in detail by referring to FIG. 5.

Referring to FIG. 5, the live images being transmitted via the control unit 36 are copied to the N frame-use RAM 41 and N+1 frame-use RAM 42 frame by frame. For instance, as the live image of one frame is copied to the N frame-use RAM 41, that of the next frame is copied to the N+1 frame-use RAM 42. Then the live image of the further next frame is copied to the N frame-use RAM 41, and so on, hence the consecutive live images are copied to the N frame-use RAM 41 and N+1 frame-use RAM 42 alternately by one frame after the next. Each of the RAM 41 and 42 may only be equipped with an approximate capacity of one frame, and the previously stored live image is overwritten and accordingly erased when a live image of one frame is copied to the RAM 41 or 42.

The change judgment unit 43 judges whether or not the live images temporarily stored in the N frame-use RAM 41 and N+1 frame-use RAM 42 are the same (i.e., no change in images or otherwise). As the judgment method, the present embodiment is configured to judge by averaging the brightness values of the entirety of the respective images and whether or not the average values are identical. For instance, the judgment is made by a value d in the following expression, where the $N_{ave}$ is the average value of a brightness value of the image stored in the N frame-use RAM 41 and the $N+1_{ave}$ is the average value of a brightness value of the image stored in the N+1 frame-use RAM 42:

$$|N_{ave}-N+1_{ave}|=d$$

If d=0, the average brightness values of the live images stored in the N frame-use RAM 41 and N+1 frame-use RAM 42 are identical, hence being judged as no change in the images. However, since a little error is generally caused by a noise component, a judgment of no change in images if d<s (where the s is a constant) in the case of d≠0 makes it possible to improve accuracy of a judgment. Incidentally, the s is approximately 10 if the dynamic range of an image brightness value is 255.

If the average brightness values of the images are identical (including the case of d<s), the two live images can be judged as the same (i.e., no change in the images), making it possible to judge that the observer has not carried out an observation operation or microscope operation such as a movement of the sample 3 or a focus adjustment. The reason is that an observation of the sample 3 by the observer conceivably accompanies a microscope operation such as a movement of the sample, focus adjustment, change of magnifications of object lenses equipped on the microscope main body 1, change of neutral density filters not shown in the figure, et cetera, and therefore a change in the live images occurs when these operations are performed, resulting in a nonidentity of the average brightness values of the two live images stored in the N frame-use RAM 41 and N+1 frame-use RAM 42, respectively.

From the consideration as described above, the judgment process by the monitor observation in-progress judgment unit 39 notifies the control unit 36 of:

the information indicating a "monitor observation complete" if $$|N_{ave}-N+1_{ave}|=d<s; \text{ while}$$

the information indicating a "monitor observation in progress" if $$|N_{ave}-N+1_{ave}|=d\geq s$$

Therefore, if the observer is observing the sample 3 by accompanying the observation operation or microscope operation as described above, the sleep function does not operate, that is, a shift to a sleep state does not occur even if there is no operation of a switch such as the mode switch 27 and exposure correction switch 28 regardless of the setup state of the sleep switch 29. This configuration prevents from shifting to a sleep state in the absence of an intention of the observer during the time of continuing an observation without operating a switch in the operation unit 11. Comparably, if the observer does not observe the sample 3 accompanying the above described observation operation or microscope operation, and if he does not operate a switch in the operation unit 11, a shift to a sleep state can be carried out according to a set time by the sleep switch 29.

As described above, the microscope-use digital camera according to the present embodiment is configured to not shift to a sleep state even if there is no operation of switch in the operation unit 11 during an observation, such as framing, of a microscope sample in the state of a presence of a sleep setup, thereby making it possible to improve an observation operability performance such as a framing. It is also configured to shift to a sleep state according to a preset time as a result of no switch operation for the operation unit 11 when an observation operation is not carried out, thereby enabling the reduction of a consumption power.

Note that various modified examples can be considered relating to the microscope-use digital camera according to the present embodiment as in the following.

Modified Example 1

For example, the monitor observation in-progress judgment unit 39 according to the present embodiment is configured to judge whether or not images are identical (i.e., whether or not there is no change in images) by comparing the entirety of the images; an alternative configuration, however, may be to judge by comparing a part of the images. For example, in the case of comparing images only in about 30% of the area size at the center of the images, the time required for copying images to the N frame-use RAM 41 and N+1 frame-use RAM 42 can be shortened because the live images to be copied to the N frame-use RAM 41 and N+1 frame-use RAM 42 are not the entirety of the images but a part thereof (i.e., 30% in this case). Besides, the capacities of the N frame-use RAM 41 and N+1 frame-use RAM 42 may merely be the ones each for accommodating a part of the image, thereby making it possible to minimize a RAM capacity and accordingly contribute to a cost reduction and a minimization of a RAM component equipment space. Also, because the number of pixels for calculating the $N_{ave}$ and $N+1_{ave}$ values, which are used when calculating a value d, is reduced, hence enabling a shortening of time and a reduction of a load on the control unit 36.

Modified Example 2

And, the monitor observation in-progress judgment unit 39 according to the present embodiment is configured to judge whether or not images are identical (i.e., whether or not there is no change in images) based on the averages of the brightness value of the images; an alternative configuration, however, may be in a manner to judge based on contrast values of the images. In such a case, the change judgment unit 43 calculates the contrast value of each of the live images copied to the N frame-use RAM 41 and N+1 frame-use RAM 42, calculates the difference of the two contrast values and, if the difference is identical (including the case of the difference being within a predefined range), notifies the control unit 36 of the information indicating a "monitor observation complete", while if the difference is non-identical (excluding the case of the difference being within a predefined range), notifies the control unit 36 of the information indicating a "monitor observation in progress".

Modified Example 3

And it is also possible to configure by combining the above described modified examples 1 and 2. An example configuration comprises both of the monitor observation in-progress judgment unit (which is named as 39*a*) according to the above described modified example 1 and the monitor observation in-progress judgment unit (which is named as 39*b*) according to the above described modified example 2, in place of the monitor observation in-progress judgment unit 39 according to the present embodiment. Alternatively comprised are both of the monitor observation in-progress judgment unit 39 according to the present embodiment and the monitor observation in-progress judgment unit 39b according to the above described modified example 2. In this case, the control is in a manner to regard as monitor observation complete as the judgment result of the S5 shown in FIG. 7 being "no" only if both of the two monitor observation in-progress judgment units 39a and 39b (or the units 39 and 39b) notify the control unit 36 of the information indicating a "monitor observation complete", while regard as the monitor observation in progress as the judgment result of the S5 being "yes" if otherwise, that is, if the judgments of the two monitor observation in-progress judgment units 39a and 39b (or the units 39 and 39b) are different from each other or if both of the two monitor observation in-progress judgment units 39a and 39b (or the units 39 and 39b) notify the control unit 36 of the information indicating a "monitor observation in progress". This configuration makes it possible to further improve the judgment accuracy of the step S5. A focused point is generally figured out from a contrast value. Accordingly, it there is a difference in the contrast values of two live images, it is sometimes the case of searching for a focused point by adjusting a focus. In such a case, a change of the brightness values of a live image, frame by frame, is sometimes small if a minute adjustment of the focus has been performed. However, the contrast values are different even in this case, making it possible to judge in the S5 more adequately as compared to the case of a judgment in the S5 based on solely a change of the brightness values.

Modified Example 4

Figure 8:
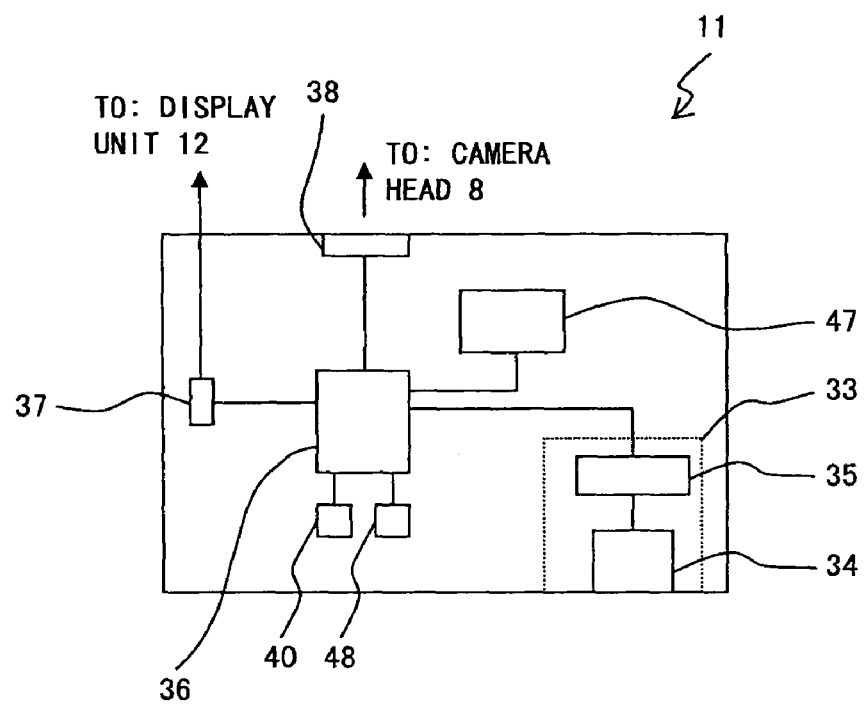
FIG. 8 is an illustration diagram of an internal comprisal of an operation unit according to a modified example 4 of the embodiment 1.

The present embodiment may also be configured to carry out the judgment of the S5 shown in FIG. 7 based on a change in a right exposure time. FIG. 8 is an illustration diagram of an internal comprisal of an operation unit 11 in this case. As shown in FIG. 8, the difference from the operation unit 11 shown by FIG. 4 lies where an exposure control unit 47 is added anew and the monitor observation in-progress judgment unit 39 is replaced by an exposure change judgment unit 48. Referring to FIG. 8, the exposure control unit 47 measures a brightness value of digital image data of a sample image input to the control unit 36 and controls an exposure time by way of the control unit 36 so that the digital image data becomes a right brightness value. For instance, in the case of the maximum value of a brightness value being 255, the exposure time is controlled to make it about 200. By so doing, the control is in a manner to extend the exposure time if a sample image is dark, and shorten the exposure time if the sample image is bright. Therefore, the digital image data in this case always has a brightness value of about 200. Meanwhile, the exposure time setup information for controlling the exposure time is also input to the exposure change judgment unit 48 constantly. The exposure change judgment unit 48 detects a change in the exposure time at a constant time interval based on the input exposure time setup information and, if there is a change, notifies the control unit 36 of the information indicating a "monitor observation in progress", while if there is no change, notifies the control unit 36 of the information indicating a "monitor observation complete". In the case of detecting a change in an exposure time at one second interval for example, the exposure change judgment unit 48 stores an exposure time Te at a certain clock time, compares the exposure time Te with an exposure time Te' in one second after the aforementioned clock time and judges an existence or nonexistence of a change. A judgment interval of the exposure change judgment unit 48 may be good enough at about one second as described above because a common exposure time for a microscope sample image is about the range of $1/15$ to $1/20000$ seconds; except that some sample image (e.g., a fluorescent sample, et cetera) requires an exposure time in the range of several seconds to several minutes. In such a case, the exposure change judgment unit 48 may be configured in a manner to make a time T to obtain an exposure time Te' as variable at a time of obtaining an exposure time Te at a certain clock time. Assuming that the exposure time Te at a certain clock time is one second or less, an exposure time Te' to be obtained next is determined as one second (=T) thereafter, and, if the exposure time Te exceeds one second, e.g., eight seconds for example, an exposure time Te' is to be obtained at Te+1 seconds (e.g., 8+1=9 seconds) thereafter. Then the exposure change judgment unit 48 compares between the exposure times Te and Te' and, if it judges as there is a change, notifies the control unit 36 of the information indicating a "monitor observation in progress", while if it judges as there is no change, notifies the control unit 36 of the information indicating a "monitor observation complete".

Incidentally, a change in exposure times have been described, which may be judged by storing an exposure evaluation value, and the judgment may be made from a change of the evaluation value.

Modified Example 5

The process relating to the sleep function (refer to FIG. 7) according to the present embodiment may also be configured to set a state of the sleep switch 29 automatically to "Off" in the case of the information indicating a "monitor observation in progress" being notified when the time to shift to the sleep state, which is set by the sleep switch 29, passes. FIG. 9 is a flow chart showing a process relating to the sleep function in this case. As shown in FIG. 9, the difference from the process shown in FIG. 7 lies only where, if the judgment result is "yes", the process proceeds to the S7 and sets the state of the sleep switch to "Off", followed by returning to the S2. By this configuration, the sleep function is turned "Off" if the judgment in S5 is "yes", that is, regarding as a monitor observation in progress.

Modified Example 6

Figure 10:
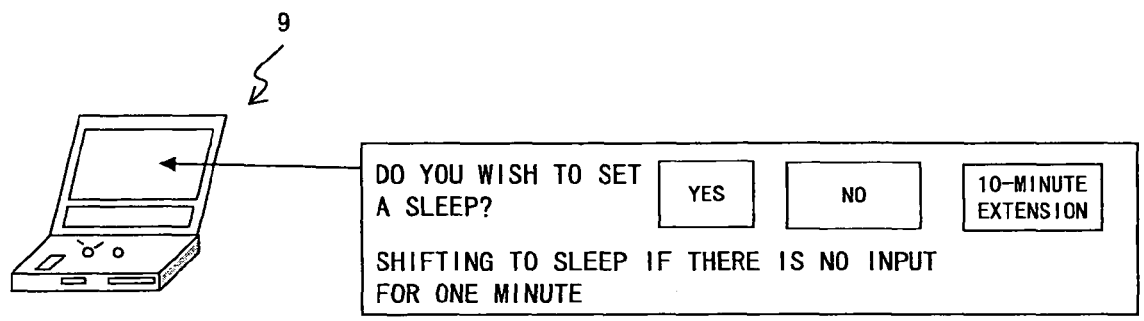
FIG. 10 is a diagram showing a menu displayed in a display unit according to a modified example 6 of the embodiment 1.

The present embodiment may also be configured to enable an observer to select whether or not to shift to a sleep state before shifting thereto. FIG. 10 is a diagram showing a menu displayed in the display unit 13 prior to shifting to a sleep state; and FIG. 11 is a flow chart showing a process relating to the sleep function in this case. The present modified example is configured to enable the observer to select either "yes", "no" or "ten-minute extension" relating to whether or not to shift to the sleep state by way of the menu displayed prior to shifting thereto, as shown in FIG. 10. Also displayed is "shifting to sleep if there is no input for one minute". If the observer selects "yes" according to this menu, the process shifts to the sleep state, while if he selects "no", the process does not shift to a sleep state. If he selects "ten-minute extension", then 10-minute is set as the time to shift to the sleep state, followed by the menu being displayed in another ten minutes. Incidentally, also configured is to regard that the "yes" is selected in the case that neither selection is made within one minute of displaying the menu as shown in FIG. 10 just as indicated by the display of "shifting to sleep if there is no input for one minute".

The next description is of a process relating to the sleep function according to the present modified example while referring to FIG. 11. This process is different from the one shown in FIG. 7 only where the steps S8 and S9 are added between the judgment result of "no" in the step S5 and the step S6 as shown in FIG. 11. That is, if the judgment result of S5 is "no", the process displays the menu shown in FIG. 10 (S8). Then it judges whether or not the "yes" has been selected from among the menu, or whether or not one minute has passed with nothing being selected after displaying the menu (S9) If the judgment result is "yes", that is, the "yes" is selected from among the menu or one minute has passed with nothing being selected in this event, it proceeds to the S6, thus shifting to a sleep state. Contrarily, if the judgment result of S9 is "no", that is, if the "no" or "ten-minute extension" is selected, the process returns to the S4 without shifting to a sleep state. Incidentally, if the "ten-minute extension" has been selected in this event, the setup of a state of the sleep switch 29 is changed to "ten-minute". Such a configuration makes it possible to not shift to a sleep state if the "no" is selected from among the menu shown in FIG. 10 in the case of being in observation although there is no change in the sample image, such as the case of the observer being in a monitor observation of a stationary sample, such as a slide sample, in a state of no movement of the state or no change of an object lens magnification, et cetera, for example, thereby enabling a further improvement of an observation performance.

Modified Example 7

The monitor observation in-progress judgment unit 39 according to the present embodiment is configured to adopt, as images for comparison, a live image of the nth frame and that of the immediate next n+1-th frame, such comparison of images, however, may be performed between live images which are apart from each other by a predetermined number of frames for example, such as a live image of the nth frame and that of the n+10-th frame. In this case, since a time interval between images for comparison is extended, it is accordingly possible to firmly judge an observation in progress or not even for an observation operation that is slightly changing. Also in this case, the number of frames to skip over may be discretionarily set.

Modified Example 8

The process relating to the sleep function (refer to FIG. 7) according to the present embodiment is configured to make the two judgments in the steps S4 and S5, followed by regarding as monitor observation in progress or monitor observation complete, alternatively possible, however, is to regard it by a single judgment. That is, if the judgment result of S3 is "yes", the process judges whether it is $T1 \geq T2$ and also the information notified from the monitor observation in-progress judgment unit 39 is one indicating a "monitor observation in progress", or it is $T1 \geq T2$ and also the information notified from the monitor observation in-progress judgment unit 39 is one indicating a "monitor observation complete", and regards as a monitor observation in progress if the judgment result is the former, while regards as a monitor observation complete if the judgment result is the latter.

Embodiment 2

A microscope-use digital camera according to an embodiment 2 of the present invention is configured to recover from a sleep state and turn on a display of the display unit 12 if a monitor observation is started when a display of the display unit 12 is turned off after shifting to a sleep state. Otherwise the configuration is the same as that of the embodiment 1.

More specifically, the microscope-use digital camera according to the present embodiment is configured in a manner that the control unit 36 controls so as to recover from a sleep state if the information indicating a "monitor observation in progress" is notified from the monitor observation in-progress judgment unit 39 to the control unit 36.

As such, the microscope-use digital camera according to the present embodiment is configured to turn on a display of the display unit 12 just by starting a microscope operation including an object lens magnification change, framing, focusing, et cetera, in a sleep state, thereby enabling a simplification of a camera operation and an improvement of operability.

Embodiment 3

A microscope-use digital camera according to an embodiment 3 of the present invention is configured to make the monitor observation in-progress judgment unit 39 not function in the PLAY mode. Otherwise the configuration is the same as that of the embodiment 1.

Figure 12:
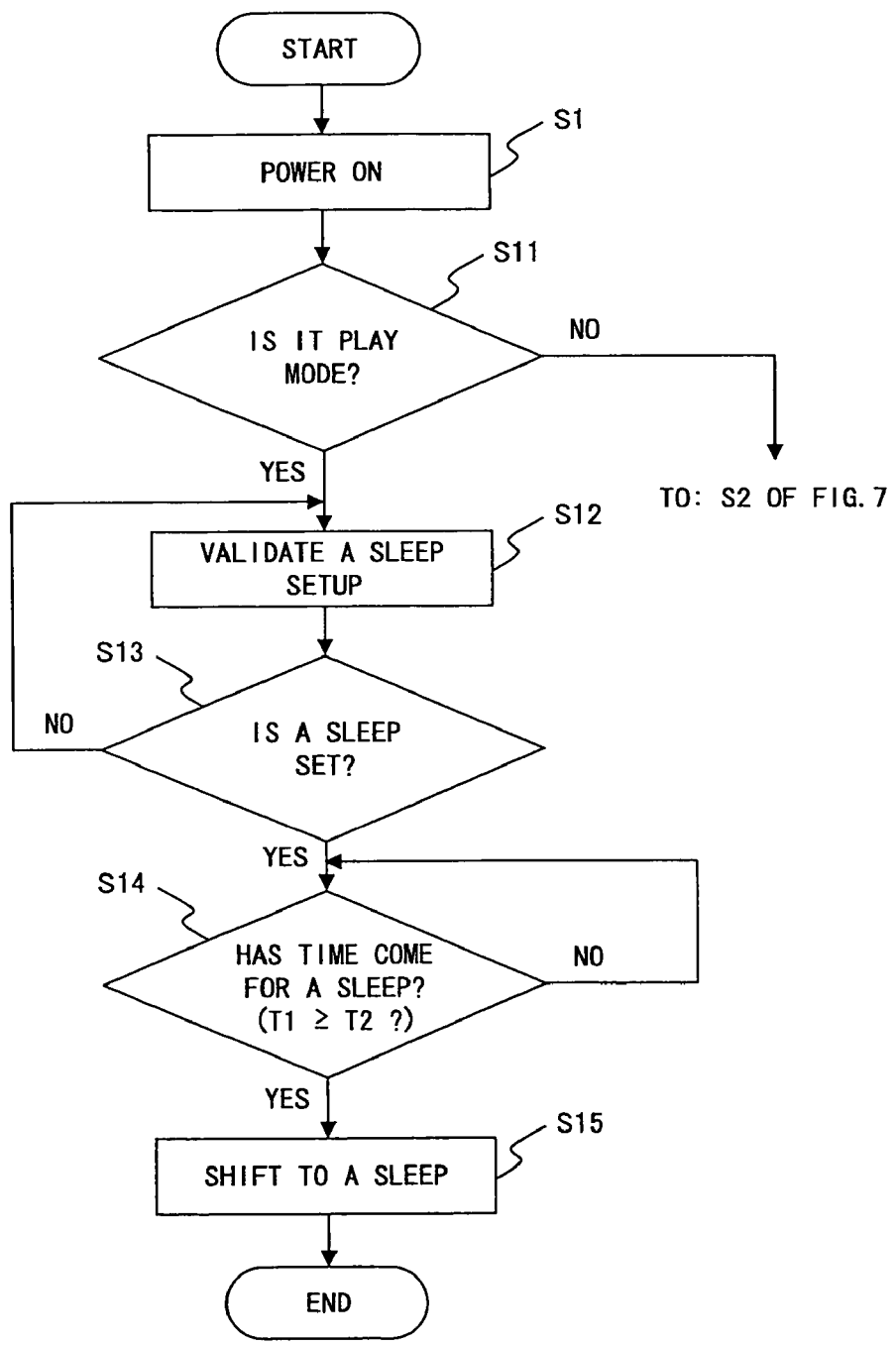
FIG. 12 is a flow chart showing a process relating to a sleep function according to an embodiment 3.

FIG. 12 is a flow chart showing a process relating to a sleep function according to the present embodiment.

As shown in FIG. 12, having detected a pressing of the power switch 26 in the operation unit 11 (S1), the control unit 36 subsequently judges whether or not it is the PLAY mode, that is, whether or not the state of the mode switch 27 is set to the PLAY mode (S11). If the judgment result is "no" (i.e., in the case of the REC mode) in this event, the process proceeds to the S2 shown in FIG. 7 for carrying out the process described for the embodiment 1.

Contrarily, if the judgment result of S11 is "yes" (i.e., in the case of the PLAY mode), it detects a state of the sleep switch 29 (S12), then the result of the detection of S11 is followed by judging whether or not a sleep is set (S13). If the judgment result is "no" (i.e., in the case of "Off" being selected as the state of the sleep switch 29) in this event, the process returns to the S12.

Contrarily, if the judgment result of S13 is "yes" (i.e., in the case of "1 minute" or "10 minutes" being selected as the state of the sleep switch 29), the control unit 36 compares between the time T1, in which a switch is not operated, measured by the operation judgment unit 40 and the time T2 until shifting to a sleep state, which is set by the sleep switch 29, and judges whether or not $T1 \geq T2$ (S14). If the judgment result is "no" (i.e., $T1 < T2$) in this event, the present judgment is repeated.

Meanwhile, if the judgment result of S14 is "yes" (i.e., $T1 \geq T2$), the process shifts to a sleep state (S15). Note that the present embodiment defines "a shift to a sleep state" as turning off the displays of the image display panel 44 and information display panel 45.

The above described process makes a shift to a sleep state according to a setup by the sleep switch 29 even if there is a change in a live image (i.e., a sample image) which is not noticed by an observer in the PLAY mode, enabling the observer to make a shift to a sleep state at his intended timing.

As described above, the microscope-use digital camera according to the present embodiment is configured to firmly shift to a sleep state when the time until shifting thereto, which is set by the sleep switch 29, has passed while there is no operation of a switch although there is an operation for observing a microscope sample in the PLAY mode, thereby enabling a power save operation.

Embodiment 4

A microscope-use digital camera according to an embodiment 4 of the present invention is configured to comprise a time lapse photographing function (i.e., an interval photographing function) which is a function capable of photographing and recording images at a preset time interval and shift to a sleep state except in the states of a photographing in progress, a pre- and post-photographing during the execution of the time lapse photographing. Otherwise the configuration is the same as that of the embodiment 1.

The microscope-use digital camera according to the present embodiment is configured to enable a display of a menu for a time lapse photographing in the display unit 12 by a prescribed operation and a setup relating to the time lapse photographing by a switch operation in the operation unit 11. An example configuration is to enable a setup of a photographing time interval and of the number of photographs between one second and one day, and between one piece and 1000 pieces, respectively, allowing photographing the set number of pieces of photographs at the set time interval. In the case of setting 100 pieces of photography at one hour interval, the camera photographs the first piece in one hour after starting a time lapse photographing, followed by photographing the second piece in one hour thereafter, and so on, and thus the camera spends 100 hours for photographing 100 pieces. Needless to say, this configuration enables the observer to leave the microscope-use digital camera 2 in operation after setting it up relating to the time lapse photographing.

The microscope-use digital camera according to the present embodiment is configured likewise the microscope-use digital camera according to the embodiment 1 in terms of the operation relating to a sleep function in the event of not operating in the time lapse photographing, whereas the former is configured to shift to a sleep state except in the states of a photographing in progress, a pre- and post-photographing regardless of the state of a setup by the sleep switch 29 once the time lapse photographing is started. For example, in the case of setting 100 pieces of photography at one hour interval as described above, a start of a time lapse photographing is immediately followed by shifting to a sleep state and turning off a display of the display unit 12. Then, the configuration is such as to recover from the sleep state, and turn on a display of the display unit 12 at a predetermined time (e.g., a few seconds) prior to the time of one hour passing from the start of the time lapse photographing, photographs the first image at the time of one hour passing from the start of the time lapse photographing, shift to a sleep state and turn off a display of the display unit 12, and soon, thus repeating the aforementioned operations until the 100-th image has been photographed.

As described above, the microscope-use digital camera according to the present embodiment is configured to shift to a sleep state except in the states of a photographing in progress, a pre- and post-photographing even during the execution of the time lapse photographing in which an observer is not present in the vicinity in many cases, thereby enabling a power save operation.

Also, even in the case of turning off the power to the camera head 8 in addition to turning off the display unit 12 during a sleep state, there is no risk of failing a time lapse photographing because of a recovery from the sleep state during a photographing in progress, a pre- and post-photographing while executing a time lapse photographing.

Note that a modified example can be considered for the microscope-use digital camera according to the present embodiment, as follows:

For instance, the present embodiment may be configured to limit a part recovering from a sleep state to the ones relating to a photographing when executing a time lapse photographing. An example configuration is, if the power supply to the camera head 8 and a display of the display unit 11 are turned off simultaneously during a sleep state, the power supply to the camera head 8 and display of the display unit 11 are turned off simultaneously at the time of shifting to the sleep state, and then the power supply to the camera head 8 only is restarted, while a display of the display unit 12 is left turned off, at the time of recovering from the sleep state during the execution of a time lapse photographing. This configuration makes it possible to carry out a time lapse photographing with a display of the display unit remaining turned off during the execution of the time lapse photographing in which an observer is not present in the vicinity of a microscope-use digital camera in many cases. This in turn enables a power save operation for the time lapse photographing. Furthermore, another example configuration may be to turn on a display of the display unit 12 when an observer presses the EXP SW 30 during a time lapse photographing, thereby making a progressing condition thereof apparent.

Embodiment 5

A microscope-use digital camera according to an embodiment 5 of the present invention is configured to eliminate the sleep SW 29 (refer to FIG. 3) and operation judgment unit 40 (refer to FIG. 4) from the microscope-use digital camera according to the embodiment 1, and not to monitor an existence or nonexistence of a switch operation (i.e., a switch input).

Figure 13:
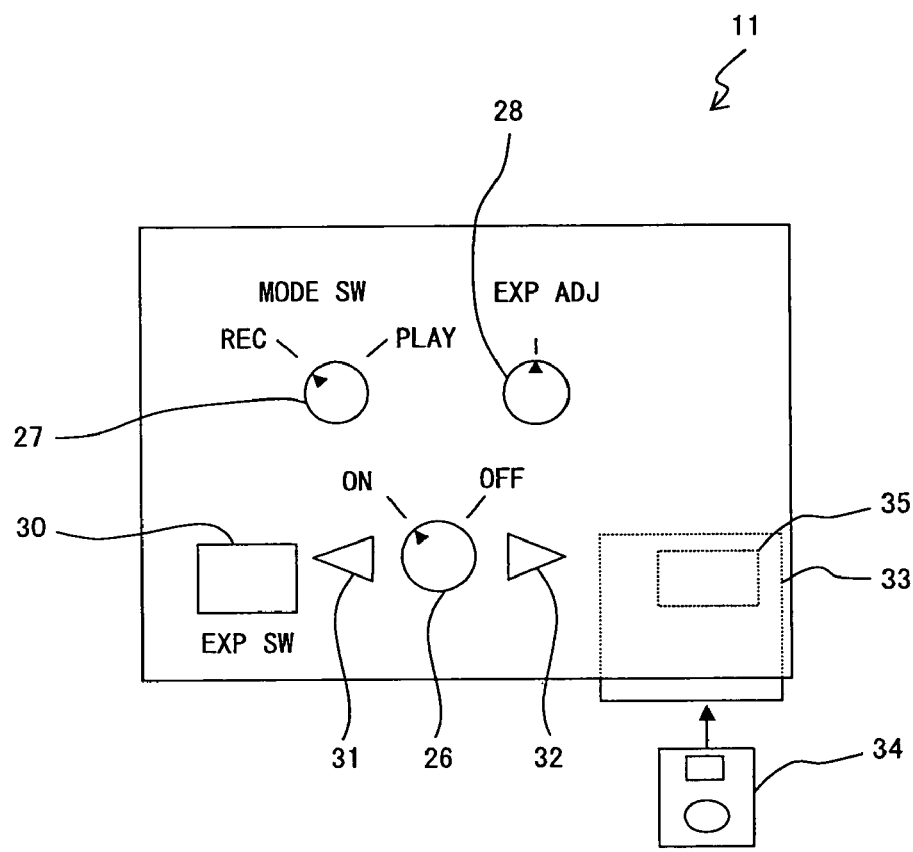
FIG. 13 is an upper external view diagram of an operation unit according to an embodiment 5.

FIG. 13 is an upper external view diagram of an operation unit 11 according to the present embodiment. As shown in FIG. 13, it is the same as the operation unit 11 according to the embodiment 1 except where the sleep SW 29 is eliminated.

FIG. 14 is an illustration diagram showing an internal comprisal of the operation unit 11 according to the present embodiment. As shown in FIG. 14, it is the same as the operation unit 11 according to the embodiment 1 except where the operation judgment unit 40 is eliminated.

Figure 15:
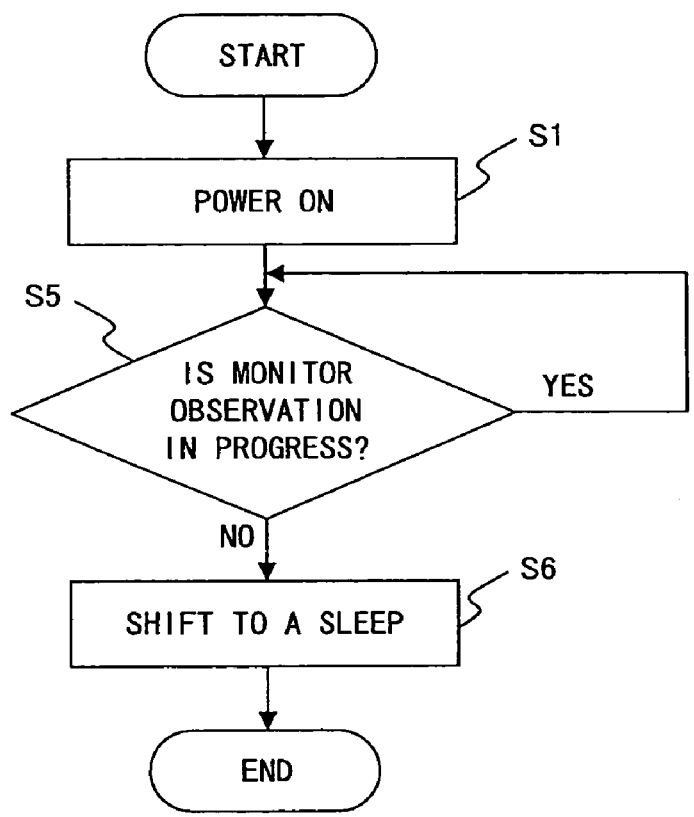
FIG. 15 is a flow chart showing a process relating to a sleep function according to the embodiment 5.

FIG. 15 is a flow chart showing a process relating to a sleep function according to the present embodiment. As shown in FIG. 15, the process relating to the present embodiment is the same as one relating to the embodiment 1 shown in FIG. 7 except where the processes of the steps S2 through S4 are eliminated. That is, having detected a pressing of the power switch 26 in the operation unit 11 (S1), the control unit 36 then obtains the information notified from the monitor observation in-progress judgment unit 39 and judges whether or not it is the information indicating a "monitor observation in progress" (S5). If the judgment result is "yes" (i.e., the case of the information being one indicating a "monitor observation in progress") in this event, it regards as monitor observation in progress, and repeats the present judgment process. Contrarily, if the judgment result of S5 is "no" (i.e., the case of the information being one indicating a "monitor observation complete"), it regards as monitor observation complete and then shifts to a sleep state (S6).

As such, the process according to the present embodiment differs from that of the embodiment 1 where a shift to a sleep state is not associated with an existence or nonexistence of a switch input.

Note that an alternative configuration may be such that a shift to a sleep state is in a predetermined time, such as one minute, after the judgment result being "no" in S5, in lieu of an immediate shift to the sleep state.

As described above, the microscope-use digital camera according to the present embodiment is configured to shift to a sleep state if regarding a monitor observation complete (i.e., if the judgment result of S5 of FIG. 15 is "no"), even in the case of eliminating the function of shifting to the sleep state by an existence or nonexistence of a switch operation (i.e., an switch input), thereby eliminating the necessity of a monitoring of a switch operation. It accordingly enables a microscope-use digital camera to be further compact and low cost. It also makes it possible to shift to a sleep state approximately simultaneously with the time of regarding a monitor observation complete, thereby enabling the sleep function to work just as the observer intends to and an improvement of operability.

Embodiment 6

A microscope-use digital camera according to an embodiment 6 of the present invention is configured to shift to a sleep state when matching with a desired image by an observer, which is registered in advance.

FIG. 16 is an upper external view diagram of an operation unit 11 according to the present embodiment. It is the same as the operation unit 11 (refer to FIG. 3) according to the embodiment 1 except where an image storage switch (SW) 51 is added as shown in FIG. 16. The configuration is such that the image storage switch 51 is pressed, an image picked up by the camera head 8 at the time is stored in a later described image storage-use RAM.

Figure 17:
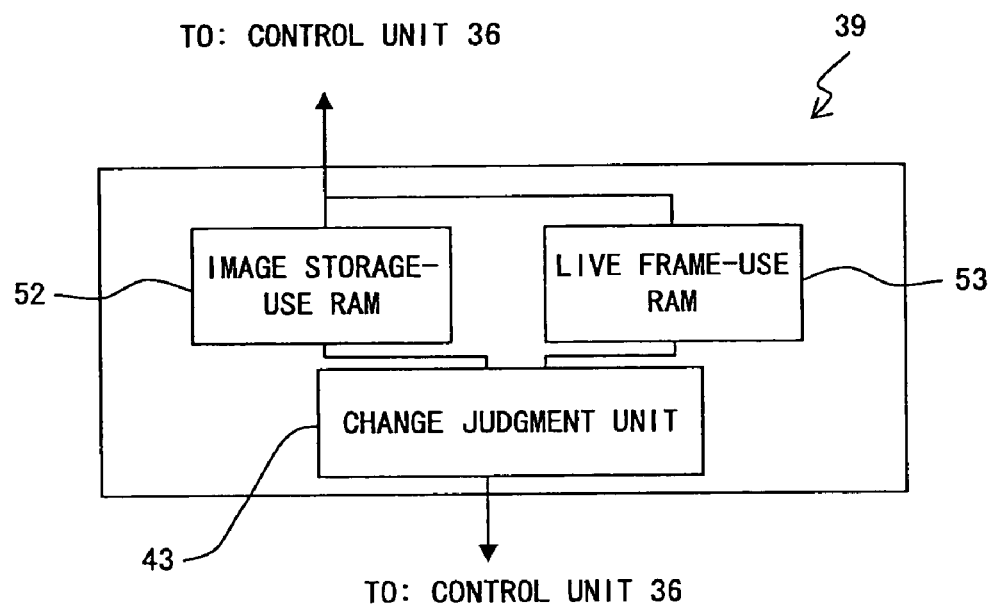
FIG. 17 is an illustration diagram showing an internal comprisal of a monitor observation in-progress judgment unit according to the embodiment 6.

FIG. 17 is an illustration diagram showing an internal comprisal of a monitor observation in-progress judgment unit 39 according to the present embodiment. Being the same as the monitor observation in-progress judgment unit 39 (refer to FIG. 5) according to the embodiment 1 where two pieces of RAM and a change judgment unit 43 are comprised, the present embodiment, however, is configured to use the two pieces of RAM as an image storage-use RAM and live frame-use RAM, as shown in FIG. 17. The image storage-use RAM 52 stores an image obtained according to an observer pressing the above noted image storage switch 51. The live frame-use RAM 53 stores a live image being copied frame by frame. In the embodiment 1, a live image is stored in the two pieces of RAM 41 and 42 alternately by being copied frame by frame, whereas the present embodiment has only one piece of RAM 53 store by a live image being copied frame by frame. Incidentally, the capacity of the live frame-use RAM 53 may merely be for about one frame as in the case of the embodiment 1. In this case, the previously stored live image is over-written and accordingly erased at every time a live image of one frame is stored in the live frame-use RAM 53.

Note that the change judgment unit 43 compares the two images stored in the two pieces of RAM 52 and 53, respectively, judges whether or not the two images are identical (i.e., no change in images or otherwise) and, if they are identical (i.e., no change in images) (including the case of being approximately identical), notifies the control unit 36 of the information indicating a "monitor observation in progress", while if they are not identical (i.e., there is a change in images) (including not being approximately identical), notifies the control unit 36 of the information indicating a "monitor observation complete", as in the case of the embodiment 1.

Otherwise the configuration is the same as that of the embodiment 1.

Figure 18:
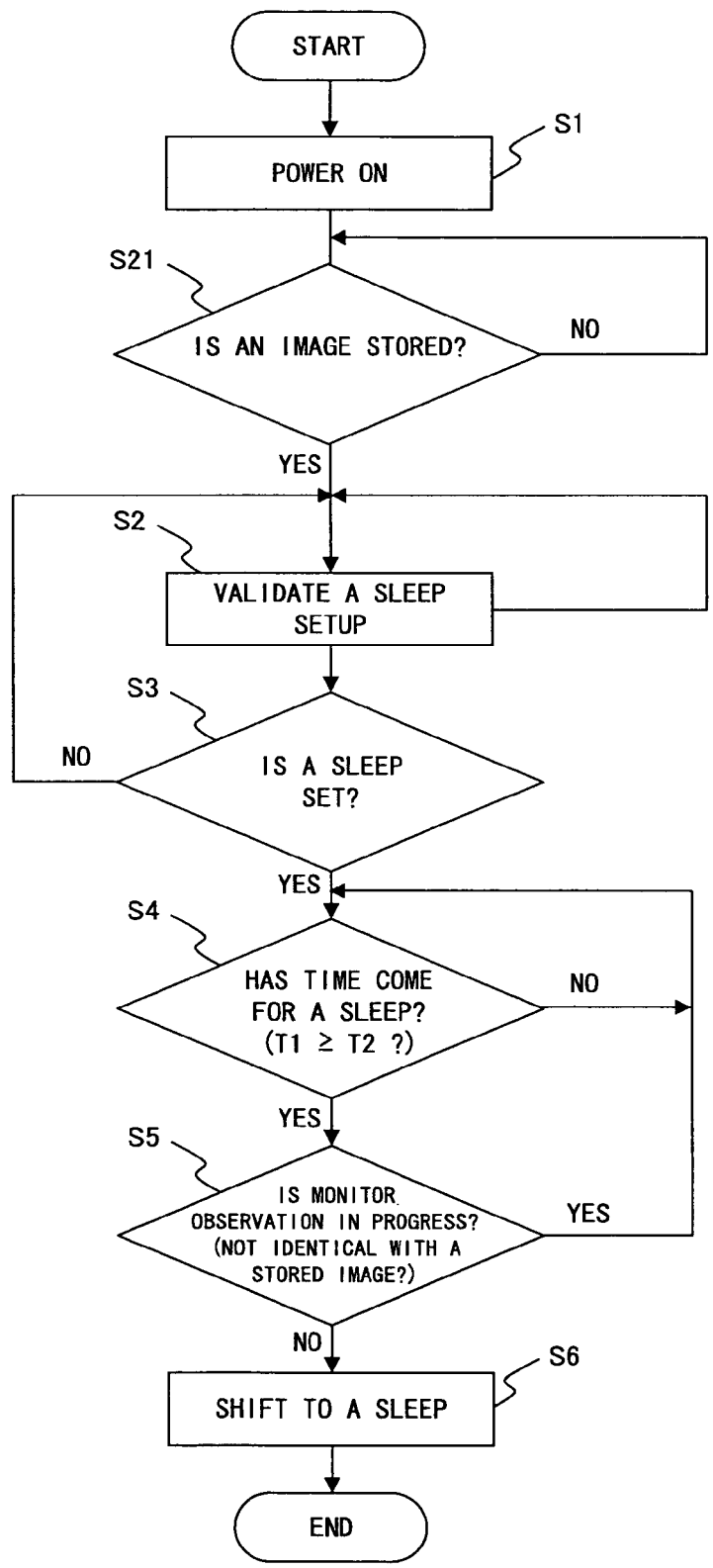
FIG. 18 is a flow chart showing a process relating to a sleep function according to the embodiment 6.

FIG. 18 is a flow chart showing a process relating to the sleep function according to the present embodiment.

In the present embodiment, having detected a pressing of the power switch 26 in the operation unit 11 (S1), the control unit then judges whether or not an image is stored in the image storage-use RAM 52 (S21) as shown in FIG. 18.

Note that an image stored in the image storage-use RAM 52 is one having photographed a state which is desired to shift to a sleep state after an observer completes a monitor observation such as a state of removing the sample 3 from the microscope main body 1, et cetera. This image is obtained by the observer pressing the above noted image storage switch 51 following his presetting such a state, and is recorded in the image storage-use RAM 52.

If the judgment result of S21 is "no" (i.e., an image is not stored in the image storage-use RAM 52), the present judgment is repeated until an image is stored in the image storage-use RAM 52 by the above noted image storage switch 51. Incidentally, an alternative configuration may be to prompt the observer to store an image if the judgment result of the S21 is "no".

Contrarily, if the judgment result of the S21 is "yes" (i.e., if an image is stored in the image storage-use RAM 52), the control unit 36 then carries out the processes in the steps S2 through S6 as in the case of the embodiment 1.

In the step S5 according to the present embodiment, however, the change judgment unit 43 comprised by the monitor observation in-progress judgment unit 39 (refer to FIG. 17) according to the present embodiment judges an existence or nonexistence of a change between the image stored in the image storage-use RAM 52 and the live image stored in the live frame-use RAM 53 and, if there is a change, notifies the control unit 36 of the information indicating a "monitor observation in progress", while if there is no change, notifies the control unit 36 of the information indicating a "monitor observation complete" as described above, followed by the control unit 36 judges whether or not the information notified by the monitor observation in-progress judgment unit 39 is one indicating a "monitor observation in progress".

As described above, the process according to the present embodiment uses an image registered by the observer and a live image for judging whether or not to shift to a sleep state. Because of this, if an image (i.e., a white image) photographing a state of a sample 3 not being existence is pre-stored in the image storage-use RAM 52 in the case of the observer removing the sample 3 from the microscope main body 1 to finish the observation, it is also possible to shift to the sleep state at the time of his removing the sample 3 from the microscope main body 1. Alternatively, it is also possible to shift to a sleep state in the case of turning off the power of the microscope main body 1 or setting the beam 100% for the eye piece lens and 0% for the microscope-use digital camera by switching over a light path switchover unit (not shown herein), if a black image is stored in the image storage-use RAM 52.

As described above, the microscope-use digital camera according to the present embodiment makes it possible to register a state of an image when shifting to a sleep state according to the desire of the observer, and therefore an observation performance can be improved.

As such, a detailed description has been provided for the present invention which, however, may apparently be improved and changed in various manners possible within the scope of the present invention, in lieu of being limited by the above described embodiments.

For example, each of the above described embodiments is configured to turn off the display of the display unit 12 when shifting to a sleep state. However, a part or the entirety of the functions comprised by the present camera may be put into a rest, such as turning off the power of a part of the electrical circuit, or turning off the power of the present camera.

Also, each of the above described embodiments is configured not to shift to a sleep state if regarding as a monitor observation in progress, an alternative configuration may be to shift partially to a sleep state, in lieu of not shifting thereto.

That is, to have a part unrelated to a monitor observation shift to a sleep state because of having been regarded as a monitor observation in progress, thereby enabling only the monitor observation. For example, the power supply to the memory read/write unit 35 may be stopped. Then, a restart of the power supply may be enabled by pressing the shutter switch (i.e., EXP SW) 30.

Another configuration may be a combination of a comprisal or operation of a microscope-use digital camera according to each of the above described embodiments (including modified examples) and a comprisal or operation of a microscope-use digital camera according to another embodiment (including a modified example).

In summary, the present invention is contrived to not shift to a sleep state even if there is no operation (i.e., a switch operation) on the present microscope-use digital camera during an observation operation of a microscope sample, such as a framing, in the case of a time to shift to the sleep state being set, thereby making it possible to improve an observation operation performance such as a framing. Meanwhile, if there is no operation thereon when an observation operation is not in progress, a shift to a sleep state is performed according to a preset time, and therefore a power save operation is also enabled.

It is also contrived to enable a recovery from the sleep state only by starting a microscope operation such as an object lens magnification change, framing, focusing, et cetera, in the sleep state, thereby making it possible to simplify a camera operation and improve the operability.

It is also contrived to firmly shift to the sleep state if a state of no operation continues for a preset time to shift to the sleep state regardless of an observation operation of a microscope sample in a replay mode, thereby enabling a power save operation.

It is also contrived to shift to the sleep state except in the states of a photographing in progress, a pre- and post-photographing during the execution of a time lapse photographing in which an observer is not present in the vicinity of the present microscope-use digital camera in many cases, thereby enabling a power save operation. It is further contrived to recover from the sleep state in the states of a photographing in progress, a pre- and post-photographing, if shifted thereto, and hence there is no risk of failing the time lapse photographing.

It is also contrived to shift to the sleep state if it is possible to regard as a monitor observation complete even in the case of eliminating a sleep function based on an existence or nonexistence of an operation (i.e., a switch operation), thereby enabling a necessity of monitoring operations. This in turn enables the present microscope-use digital camera to become compact and low cost. In addition, this case makes it possible to shift to the sleep state simultaneously with regarding as a monitor observation complete, thereby enabling a shift thereto just as the observer wishes and an improvement of operability.

It is also contrived to enable a registration of the state of an image at the time of a shift to the sleep state exactly as the observer wishes, thereby making it possible to improve an observation performance.

What is claimed is:

1. A microscope-use digital camera equipped with a sleep function, comprising:
    an image pickup unit for picking up images;
    a timer unit for measuring a time of an absence of an input operation to an operation unit for operating at least one of the image pickup unit and a display unit;
    a judgment unit for judging whether a change has occurred between a first image picked up by the image pickup unit at a first clock time and a second image picked up by the image pickup unit at a second clock time which is after the first clock time;
    a selection unit for selecting one of a shift to a sleep state, no shift to the sleep state, and an extension of time to shifting to the sleep state, according to an input instruction if the time measured by the timer unit is equal to or greater than a preset time until shifting to the sleep state and if the judgment unit judges that no change has occurred between the first image picked up by the image pickup unit at the first clock time and the second image picked up by the image pickup unit at the second clock time, wherein all three of the shift to the sleep state, no shift to the sleep state, and the extension of time to shifting to the sleep state are available as selections which are selectable by the selection unit; and
    a control unit for controlling the microscope-use digital camera to one of shift to the sleep state, not shift to the sleep state, and extend the time to shifting to the sleep state, based on the time measured by the timer unit, an output of the judgment unit, and the selection by the selection unit;
    wherein the control unit controls the microscope-use digital camera to: (i) one of shift to the sleep state, not shift to the sleep state, and extend the time to shifting to the sleep state, according to the selection by the selection unit, when the time measured by the timer unit is greater than or equal to the preset time and the judgment unit judges that no change has occurred between the first image picked up by the image pickup unit at the first clock time and the second image picked up by the image pickup unit at the second clock time, and (ii) not shift to the sleep state when the time measured by the timer unit is greater than or equal to the preset time and the judgment unit judges that a change has occurred between the first image picked up by the image pickup unit at the first clock time and the second image picked up by the image pickup unit at the second clock time.

2. The microscope-use digital camera according to claim 1, further comprising an image storage unit for storing the images picked up by the image pickup unit.

3. The microscope-use digital camera according to claim 1, wherein the control unit controls the microscope-use digital camera to recover from the sleep state if, after shifting to the sleep state, the judgment unit judges that a change has occurred between the first image picked up by the image pickup unit at the first clock time and the second image picked up by the image pickup unit at the second clock time.

4. The microscope-use digital camera according to claim 1, wherein the control unit controls the microscope-use digital camera to shift to the sleep state when the time measured by the timer unit is equal to or greater than the preset time until shifting to the sleep state when a replay mode, which enables a replay of a photographed image, is set.

5. The microscope-use digital camera according to claim 1, wherein the control unit controls the microscope-use digital camera to shift to the sleep state after a passage of a predefined time following an image pickup operation by the image pickup unit, and to at least partly recover from the sleep state at a predetermined time prior to a next image pickup operation by the image pickup unit during execution of a time lapse photographing wherein the image pickup unit operates at a constant time interval.

6. A microscope-use digital camera equipped with a sleep function, comprising:

an image pickup unit for picking up images;

a timer unit for measuring a time of an absence of an input operation to an operation unit for operating at least one of the image pickup unit and a display unit;

a judgment unit for judging whether a change has occurred between first exposure control information obtained from a first image picked up by the image pickup unit at a first clock time and second exposure control information obtained from a second image picked up by the image pickup unit at a second clock time;

a selection unit for selecting one of a shift to a sleep state, no shift to the sleep state, and an extension of time to shifting to the sleep state, according to an input instruction if the time measured by the timer unit is equal to or greater than a preset time until shifting to the sleep state and if the judgment unit judges that no change has occurred between the first exposure control information obtained from the first image picked up by the image pickup unit at the first clock time and the second exposure control information obtained from the second image picked up by the image pickup unit at the second clock time, wherein all three of the shift to the sleep state, no shift to the sleep state, and the extension of time to shifting to the sleep state are available as selections which are selectable by the selection unit; and a control unit for controlling the microscope-use digital camera to one of shift to the sleep state, not shift to the sleep state, and extend the time to shifting to the sleep state, based on the time measured by the timer unit, an output of the judgment unit, and the selection by the selection unit;

wherein the control unit controls the microscope-use digital camera to: (i) one of shift to the sleep state, not shift to the sleep state, and extend the time to shifting to the sleep state, according to the selection by the selection unit, when the time measured by the timer unit is greater than or equal to the preset time and the judgment unit judges that no change has occurred between the first exposure control information obtained from the first image picked up by the image pickup unit at the first clock time and the second exposure control information obtained from the second image picked up by the image pickup unit at the second clock time, and (ii) not shift to the sleep state when the time measured by the timer unit is greater than or equal to a preset time and the judgment unit judges that a change has occurred between the first exposure control information obtained from the first image picked up by the image pickup unit at the first clock time and the second exposure control information obtained from the second image picked up by the image pickup unit at the second clock time.

7. A control method for a microscope-use digital camera equipped with a sleep function, said method comprising:

measuring a time of an absence of an input operation to an operation unit for operating at least one of an image pickup unit and a display unit;

judging whether a change has occurred between a first image picked up at a first clock time and a second image picked up at a second clock time which is after the first clock time;

selecting one of a shift to a sleep state, no shift to the sleep state, and an extension of time to shifting to the sleep state, according to an input instruction if the measured time is equal to or greater than a preset time until shifting to the sleep state and if it is judged that no change has occurred between the first image picked up by the image pickup unit at the first clock time and the second image picked up by the image pickup unit at the second clock time, wherein all three of the shift to the sleep state, no shift to the sleep state, and the extension of time to shifting to the sleep state are available as selections which are selectable; and controlling the microscope-use digital camera to one of shift to the sleep state, not shift to the sleep state, and extend the time to shifting to the sleep state, based on the measured time, an output of the judging operation, and the selection;

wherein the microscope-use digital camera is controlled to: (i) one of shift to the sleep state, not shift to the sleep state, and extend the time to shifting to the sleep state, according to the selection, when the measured time is greater than or equal to the preset time and the judging operation judges that no change has occurred between the first image picked up at the first clock time and the second image picked up at the second clock time, and (ii) not shift to the sleep state when the measured time is greater than or equal to the preset time and the judging operation judges that a change has occurred between the first image picked up at the first clock time and the second image picked up at the second clock time.

8. A non-transitory computer readable recording medium having a program stored thereon that is executable by a microscope-use digital camera equipped with a sleep function, wherein the program controls the microscope-use digital camera to execute functions comprising:

measuring a time of an absence of an input operation to an operation unit for operating at least one of an image pickup unit and a display unit;

judging whether a change has occurred between a first image picked up at a first clock time and a second image picked up at a second clock time which is after the first clock time;

selecting one of a shift to a sleep state, no shift to the sleep state, and an extension of time to shifting to the sleep state, according to an input instruction if the measured time is equal to or greater than a preset time until shifting to the sleep state and if it is judged that no change has occurred between the first image picked up by the image pickup unit at the first clock time and the second image picked up by the image pickup unit at the second clock time, wherein all three of the shift to the sleep state, no shift to the sleep state, and the extension of time to shifting to the sleep state are available as selections which are selectable; and controlling the microscope-use digital camera to one of shift to the sleep state, not shift to the sleep state, and extend the time to shifting to the sleep state, based on the measured time, an output of the judging operation, and the selection;

wherein the microscope-use digital camera is controlled to: (i) one of shift to the sleep state, not shift to the sleep state, and extend the time to shifting to the sleep state, according to the selection, when the measured time is greater than or equal to the preset time and the judging operation judges that no change has occurred between the first image picked up at the first clock time and the second image picked up at the second clock time, and (ii) not shift to the sleep state when the measured time is greater than or equal to the preset time and the judging operation judges that a change has occurred between the first image picked up at the first clock time and the second image picked up at the second clock time.

* * * * *